(12) United States Patent
Shabalin

(10) Patent No.: US 7,571,355 B2
(45) Date of Patent: Aug. 4, 2009

(54) PRODUCT SUPPORT CONNECTED ERROR REPORTING

(75) Inventor: Rostislav Shabalin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 430 days.

(21) Appl. No.: 10/684,163

(22) Filed: Oct. 10, 2003

(65) Prior Publication Data

US 2005/0081108 A1   Apr. 14, 2005

(51) Int. Cl.
G06F 11/00  (2006.01)
(52) U.S. Cl. .................. 714/38; 714/2; 715/205; 715/208; 715/210
(58) Field of Classification Search ........... 714/43, 714/56, 38, 2; 715/205, 208, 210
See application file for complete search history.

(56) References Cited

U.S. PATENT DOCUMENTS

| | | | |
|---|---|---|---|
| 5,707,779 A | 1/1998 | Naito | |
| 5,740,354 A | 4/1998 | Ben-Natan et al. | |
| 5,793,966 A * | 8/1998 | Amstein et al. | 709/203 |
| 5,822,767 A * | 10/1998 | MacWilliams et al. | 711/146 |
| 6,209,006 B1 | 3/2001 | Medl et al. | 715/205 |
| 6,260,048 B1 * | 7/2001 | Carpenter et al. | 707/104.1 |
| 6,289,370 B1 * | 9/2001 | Panarello et al. | 709/200 |
| 6,289,371 B1 * | 9/2001 | Kumpf et al. | 709/203 |
| 6,565,608 B1 * | 5/2003 | Fein et al. | 715/255 |
| 6,614,914 B1 * | 9/2003 | Rhoads et al. | 382/100 |
| 6,615,240 B1 * | 9/2003 | Sullivan et al. | 709/205 |
| 6,915,387 B1 * | 7/2005 | Huffman et al. | 711/145 |
| 6,917,961 B2 * | 7/2005 | Melet et al. | 709/203 |
| 6,925,594 B2 * | 8/2005 | Dutta et al. | 715/205 |
| 6,952,723 B1 * | 10/2005 | Laiho | 709/217 |
| 6,973,547 B2 * | 12/2005 | Nilsson et al. | 711/141 |
| 6,981,101 B1 * | 12/2005 | Miller et al. | 711/141 |
| 7,250,955 B1 * | 7/2007 | Beeman et al. | 345/592 |
| 7,493,557 B2 * | 2/2009 | Shima | 715/255 |
| 2001/0047375 A1 * | 11/2001 | Fest | 707/526 |
| 2002/0152243 A1 * | 10/2002 | Shinozaki et al. | 707/526 |
| 2002/0188661 A1 * | 12/2002 | Casais | 709/202 |
| 2002/0194371 A1 * | 12/2002 | Kadoi | 709/239 |
| 2003/0028448 A1 * | 2/2003 | Joseph et al. | 705/27 |
| 2003/0065586 A1 * | 4/2003 | Shaftel et al. | 705/27 |
| 2003/0074607 A1 * | 4/2003 | Brundridge et al. | 714/48 |
| 2003/0105774 A1 * | 6/2003 | Oldham | 707/104.1 |
| 2003/0110412 A1 * | 6/2003 | Neville | 714/25 |
| 2003/0154172 A1 * | 8/2003 | Guyan et al. | 705/80 |
| 2003/0154403 A1 * | 8/2003 | Keinsley et al. | 713/201 |

(Continued)

Primary Examiner—Scott T. Baderman
Assistant Examiner—Loan Truong
(74) Attorney, Agent, or Firm—Lee & Hayes, PLLC

(57) ABSTRACT

Methods are described for solving the problems associated with error messages by providing methods for unique identification of error messages to allow for resolving one or several messages to information, such as a knowledge base article. The methods include a method for reporting errors by generating an error message box upon determination that an error occurred, displaying the error message box to a user and allowing a user to interact with the error message box by selecting a universal resource locator (URL) in the error message box to connect to product support. The user can cause passing of a string to product support including an error message identifier to enable a search to match the error message identifier to information concerning the error. The information could be information about the error or a bug submission form for assisting product support to isolate a new error in the application.

16 Claims, 4 Drawing Sheets

U.S. PATENT DOCUMENTS

| | | |
|---|---|---|
| 2003/0185368 A1* | 10/2003 | Bradfield et al. ....... 379/201.03 |
| 2004/0107387 A1* | 6/2004 | Larsson et al. ................ 714/39 |
| 2004/0123188 A1* | 6/2004 | Srinivasan et al. ............ 714/44 |
| 2004/0133845 A1* | 7/2004 | Forstall et al. .............. 715/500 |
| 2004/0187076 A1* | 9/2004 | Ki et al. ...................... 715/513 |
| 2004/0205594 A1* | 10/2004 | Arora et al. ................. 715/513 |
| 2005/0010586 A1* | 1/2005 | Ishidera ...................... 707/100 |
| 2005/0273779 A1* | 12/2005 | Cheng et al. ................ 717/168 |
| 2006/0282834 A1* | 12/2006 | Cheng et al. ................ 717/174 |

* cited by examiner

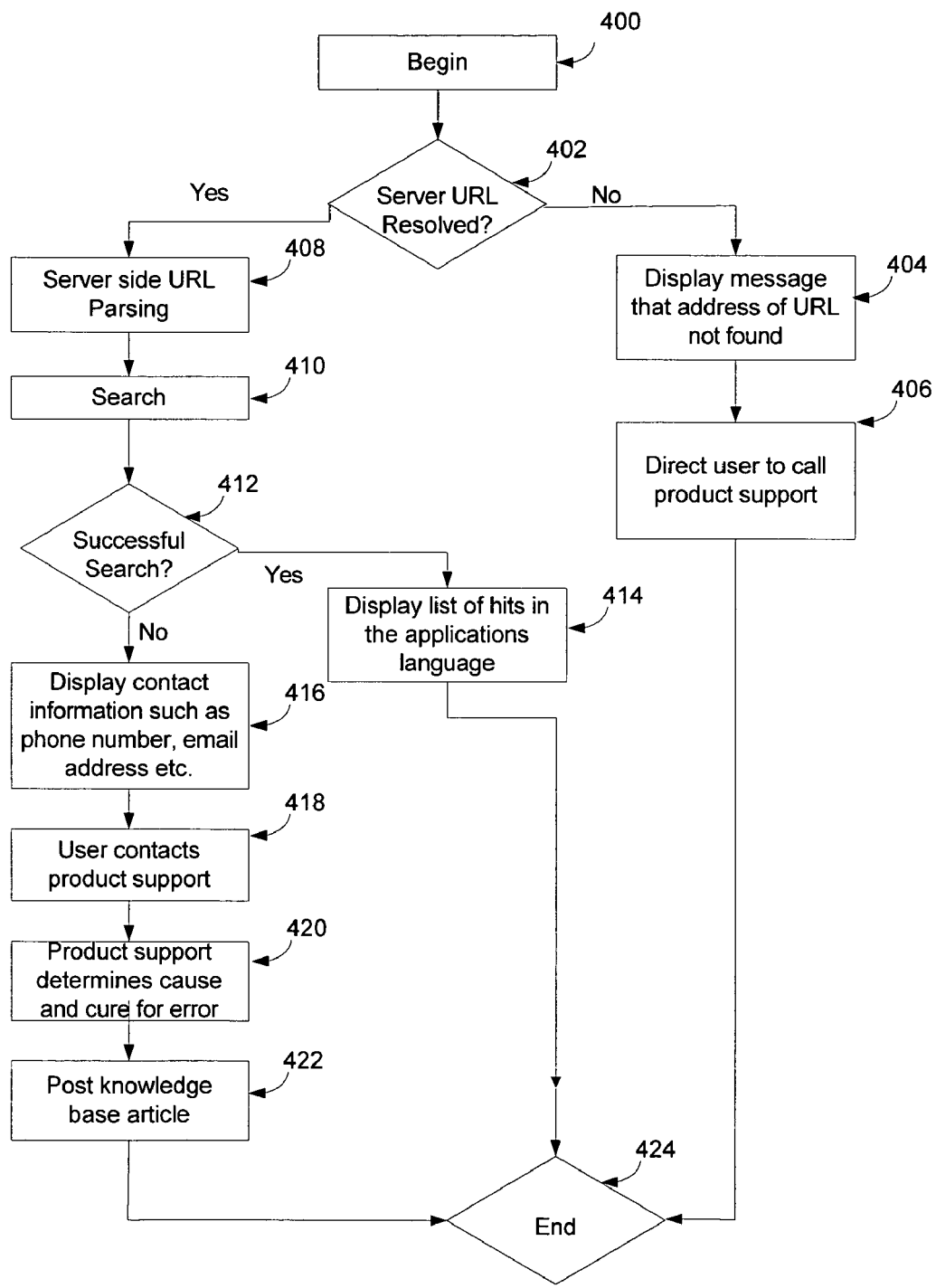

PRODUCT SUPPORT CONNECTED ERROR REPORTING

TECHNICAL FIELD

This invention relates generally to computing and, more particularly, relates to product support related error reporting and providing users with information related to software errors in a computing environment.

BACKGROUND OF THE INVENTION

Software applications seldom work flawlessly. Error reporting refers to the necessity of reporting errors in software operation to computer users, technical support personnel or to applicable software capable of dealing with an error. Typical error reporting schemes provide information and data regarding the error, but don't attempt to track the error or give updated information about possible resolution of the error. Rather, known error reporting schemes find the state an application is in at the time of an error and transfers the state to product support, without giving the user a sense of interaction. For example, an error reporting scheme could retrieve a dump of registers, the call stack and not provide feedback to a user. Rather, the user must pass information without having to understand what it is. If the user has a slow Internet connection, cooperation with product support can be a problem. If the Internet connection is failing or nonexistent, then the user may not be able to pass any information to customer support due to the length of the data requested. Also, the data can be highly technical deterring users from sending the data. For example, security worries include concerns that personal data is part of a physical dump to be sent because the user does not understand the content of the data.

Additionally, handling of program exceptions often assumes that there is a normal execution stack and an exception stack running in parallel. For reporting of exceptions, product support typically needs the state of the application stack and not of an exception handling stack. Often, however, the normal application stack is not accessible when an exception (error) is handled and reported. Retrieving the state of the application stack therefore causes extra code.

To assist product developers and users of a software product, problems in running applications often are reported to users as messages displayed in message boxes. The text of the message in the message box may be later looked up by the user in an on-line Knowledge Base (KB) for instructions for preventing or fixing the problem. However, KB articles are not guaranteed to contain the exact text from the message, or results of the search may not be helpful when the message is too generic to accommodate a range of possible errors. This becomes even more likely when an error displayed in an application via a message box can be related to a problem in some other component. A KB article can exist that is already associated with the problem in the other component, but may not exist for the error displayed in the application. Further, one problem may cause different messages to be displayed, not all of which are listed in the KB article. The message text displayed can be too general such that many matches are found. Localized error messages will be displayed on a localized system, requiring the user to search English or machine-translated KB articles, since a knowledge base is rarely human-translated into all languages in which software products are released. What is needed is a mechanism that solves the user interaction problems and associated problems when an application error occurs.

SUMMARY OF THE INVENTION

Embodiments herein are directed to solving the problems associated with error messages by providing methods for unique identification of error messages to allow for resolving one or several messages to a knowledge base article. The resolution to a knowledge base article advantageously reduces the number of product support service calls as well as the number of knowledge base articles that need to be written by application support personnel. Additionally, users are able to resolve problems with more efficiently, and be able to understand and receive information passed to a server. This reduces possible privacy concerns.

One embodiment is directed to a method for reporting errors in an application. The method includes generating an error message box upon determination that an error occurred, displaying the error message box to a user and allowing a user to interact with the error message box by selecting a universal resource locator (URL) in the error message box to connect to product support. The method then provides for passing a string to product support. The string constitutes an error message identifier created at the time of a failure to enable a search to match the error message identifier to information concerning the error. The method can also include receiving information from product support in response to the passing of the string. The information could be information about the error or a bug submission form for assisting product support to isolate a new error in the application.

The string can include several fields such as a vendor name, a product name, an image of the application, the error message identifier, and a language appropriate for the application. The string enables interaction between a user and product support via Internet (HTTP protocol) or provides sufficient information to a product support engineer if the user works without Internet connection and has to contact product support over the phone.

An embodiment is also directed to the error message box being a graphical user interface including a link to URL that can be activated by the user to connect to product support. The graphical user interface further includes a title, the link and a button for the user to acknowledge the error.

Another embodiment is directed to an API that is stored as a function responsive to a determination that an error occurred in an application. The function includes a first parameter representing a unique error message identifier, the unique error message identifier configured to enable product support to match the unique error message identifier with information concerning the error. The function also includes a second parameter representing a title for the error message; a third parameter representing one or more arguments for a string associated with the error message; and executable software adapted to receive the first, second and third parameters and generate an error message box.

Another embodiment is directed an API including a first parameter related to a vendor identifier; a second parameter related to a product identifier; a third parameter related to a application capable of experiencing an error condition; and a fourth parameter related to a unique error message identifier, the unique error identifier configured to be passed via the API to product support for matching to information concerning the error condition. The API can be configured with the Internet address of the product support site of the vendor; all URLs generated by the subsequent calls to the API will be located on this site. Default support site for the all applications calling the API without specifying the support site can be configured as well.

When product support parses a string including one or more of the parameters of the API, the parsing includes determining whether the vendor identifier identifies a supported vendor; determining whether the product identifier identifies a supported product; determining whether a version of the application is supported by product support; and if the vendor, product and version of the application are supported, performing a search using the unique error message identifier, the search in a database of articles concerning errors to identify a cause for the error condition.

The determinations are for the benefit of product support, so that parsing can be terminated if the vendor identifier or other identifiers are not validated for example.

Another embodiment is directed to a method for handling reports of an error condition, for example, from a server's point of view. The method includes receiving an error message created by an application in response to an error condition in the application. For example, upon a user linking via a URL in the error message box, the user can cause sending the error message to product support. The method further includes hierarchically parsing a string included in the error message, the string including an error message identifier and one or more of a vendor identifier, a product identifier, an application identifier and a language identifier. The product support server can then perform a search in a database of error information to match the error message identifier with error information in the database to determine a cause for the error condition and a remedy for the error condition. Whether or not a cause for the error is found, the product support returns results of the search to the calling entity, such as a user. If the results of the search are a null condition, returning contact information to enable a user to contact product support for further actions. The user can be provided with a form, such as a bug submission form with the fields in the form automatically loaded via the error message.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 4 is a flow diagram illustrating a method in accordance with an embodiment of the present invention.

DETAILED DESCRIPTION OF THE INVENTION

Figure 1:
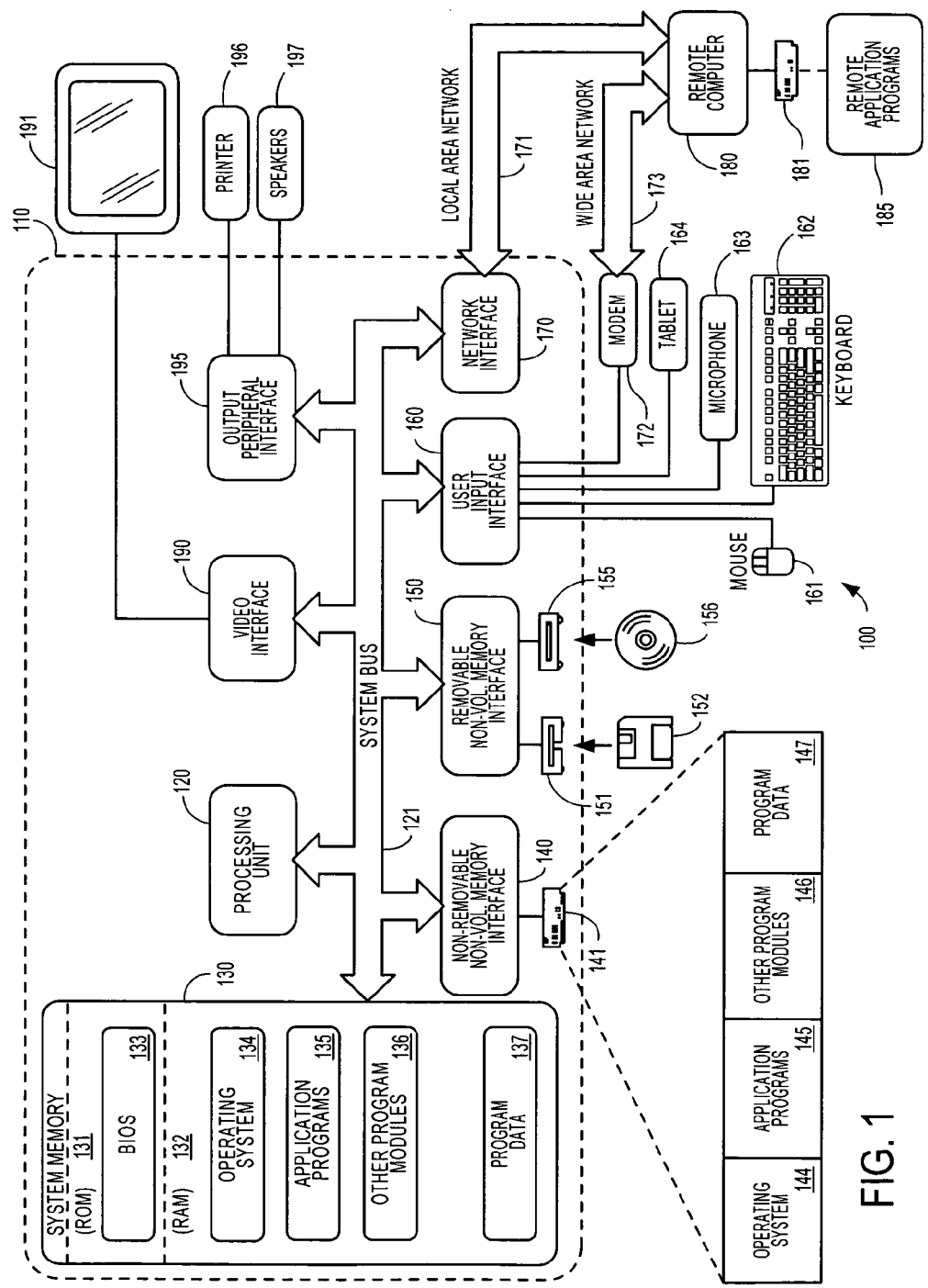
FIG. 1 is a block diagram generally illustrating an exemplary distributed computing system with which the present invention can be implemented.

Turning to FIG. 1, an exemplary computing device 100 on which the invention may be implemented is shown. The computing device 100 is only one example of a suitable computing device and is not intended to suggest any limitation as to the scope of use or functionality of the invention. The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computing device 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 operates in a networked environment, such as that shown in FIG. 1, using logical connections to one or more remote computers. FIG. 1 illustrates a general network connection 171 to a remote computing device 180. The general network connection 171 can be any of various different types of network connections, including a Local Area Network (LAN), a Wide-Area Network (WAN), networks conforming to the Ethernet protocol, the Token-Ring protocol, or other logical or physical networks such as the Internet or the World Wide Web.

When used in a networking environment, the computing device 100 is connected to the general network connection 171 through a network interface or adapter 170, which can be a network interface card, a modem, or similar networking device. In a networked environment, program modules depicted relative to the computing device 100, or portions thereof, may be stored in the remote memory storage device. Those skilled in the art will appreciate that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skilled in the art will appreciate that several of the acts and operation described hereinafter may also be implemented in hardware.

Error Messages

Applications and other programs are generally hardly ever free of experiencing error conditions. The error conditions typically generate error messages to provide information about the error. When an error occurs, messages that are viewable to a user are typically far too technical for a user to appreciate or understand. For example, an error message can include a registry dump of data that is highly technical. An error also typically requires a program to stop in order for product support to receive enough data concerning the error, such as state information at the time of the error. As a result there is seldom user interaction when an error occurs other than having a user transmit the technical data to product support.

When errors occur that are not predictable or unknown at the time an application or program is created, general error messages are typically generated by the application. Such generic error messages are typically not linked to articles in a knowledge base. Rather, a user is kept out of the loop and expected to transmit the data to product support and simply wait until product support determines the error, if, for example, the error is a fatal error.

ErrorMessageBox

According to an embodiment, a system provides a more interactive messaging system by providing an ErrorMessageBox visible to users and adequate to provide product support services with data that directs product support to an appropriate knowledge base article.

A data structure appropriate for the ErrorMessageBox provides one or more of a vendor name, a product name, an application, an identifier of the message and parameters. With each of the items in the data structure product support might be able to define an error condition that defines the problem. Some of the information to supply the data may be such that it can only be collected from the application. Other information may not need to be passed via the data structure or in a function because a platform, such as Windows® .2003 Server® platform, receives the information without the application.

In one embodiment, the ErrorMessageBox can be associated with a platform. In such an embodiment, the error messages will always go to the vendor of the platform and be related to a name, version and language that are predetermined. Accordingly, the data structure for such an error message would not include data related to vendor and product.

The application can be an image, such as a binary image that is loaded into memory at the time an application generates an exception. The application may or may not be related to the product a user is operating at the time of an error. The application that generates an error, for example, can be an error handling application. Parameters can be included in the data structure when dynamic data is necessary. More particularly, an error message to be sent to product support that includes an identifier and not parameters may not be sufficient because the identifier is static. Product support may require additional dynamic data. Additionally, parameters can be provided that link an error to articles in a knowledge base in a configurable fashion such that an error message can be dynamically linked to a vendor of an application or a creator of an application with a dynamic knowledge base updated by the support personnel as new problems are discovered in the product and new solutions for the known problems are created.

Application Programming Interfaces (APIs)

According to an embodiment, one or more application programming interfaces provide interfaces for passing data between components of the system. More specifically, the API can include parameters or a data structure that provides a vendor name, a product name and version, an application or "image", and identifier of the message and parameters to be passed.

In one embodiment, APIs are implemented to support interaction of the ErrorMessageBox. The APIs can support either a platform implementation or an independent application or program running on a user computer system. In one embodiment, one or more APIs are added to a Win32 platform and include a library of resources for an application. The APIs can be implemented in managed code or code that may or may not be executed directly on hardware of a user's computer system, or on a virtual machine type system. The ErrorMessageBox can be implemented as a function passing arguments between components of a computer system as follows:

ErrorMessageBox (integer message ID,
TCHAR* arguments [ ],
TCHAR* title)

The message ID represents a message identifier associated with the error occurred as determined by the application. The arguments and title fill out the balance of the field in the ErrorMessageBox and are subject to design requirements. In one embodiment, another API function can be required when it is desired to have an error message box provided to product support associated with third party vendors rather than to the creator of a product. To provide such an ability, a SetErrorReporting function can be implemented as follows:

SetErrorReporting (string support URL,
string appName,
string appVersion,
string Message ID
string language)

More particularly, the function provides a universal resource locator (URL) that directs the error message to a website at which product support is located. The function can also provide the name and version of an application and the language if necessary.

The URL sent by SetErrorReporting can include parameters. In one embodiment, the parameters include the data structure discussed above, including product, version, message identifier and language. A server parsing the parameters can parse in the order: product or application name, version of the application, message identifier and then language. The language can be relevant to localized systems wherein application differences are related to the language of the application. Language can be relevant to a knowledge base article, for example, for applications that operate with functions that are ubiquitous and provide language differences as additional code only. It is assumed that in the event no localized content is available in the knowledge base, a matching original (non-localized) article is suggested to the user.

A message could be generated and directed to product support without including a message identifier in some cases because the error produced had not previously been experienced. In such cases, a new "bug" in the software could have been found. The error message sent to product support by a user with a message identifier. However, no hits will be found on the product support server.

The identifier can be one of the parameters to the ErrorMessageBox that can be used to identify the message in a way that allows display of an error message and allows identification of the error message in a hierarchical structure. In one embodiment, only the portion of the identifier necessary to resolve a message to a knowledge base article is used by product support. For example, the hierarchical structure can provide a software vendor level followed by and application or operating system level, followed by an application's version level, followed by the identifier of the message being displayed, and then parameters being passed. Some of the parts of the identifier can be determined at run-time of the application by, for example, an infrastructure for the identifier and would not be passed as parameters.

User Interface

Figure 2:
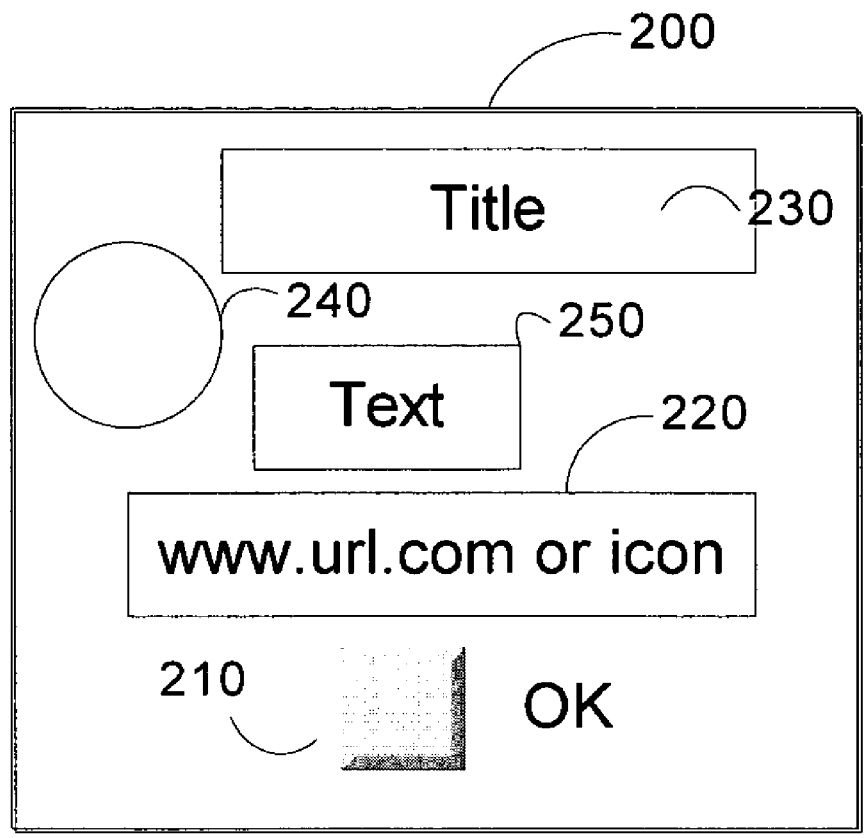
FIG. 2 is a block diagram of a graphical user interface in accordance with embodiments of the present invention.

Referring to FIG. 2, an embodiment is directed to a user interface appropriate for the API function described above. More particularly, a message box 200 displayed using the API can implement a graphical user interface such that a user can respond with "ok" 210 via a button, include a caption, an item, and a message, and a URL 220 leading to the product support, and can be non-technical, such as "connect to product support" as a short cut, button or actual URL. As will be appreciated by one of skill in the art with the benefit of this disclosure, the actual method of reaching product support can be any appropriate human readable actuation method. The message box 200 can also include a title 230, a system-provided icon 240, and text 250 explaining conditions. The URL 220 extends the user interface of a message box by allowing a user to connect to a product support service site for additional information.

The user interface for message box 200 displayed by ErrorMessageBox can be configured to match existing message boxes with the addition of a button/URL 220 allowing a user to connect to product support for additional information. Clicking the button/URL 220 can open a Help and Support center or a default browser that connects to product support. The product support would receive the generated message identification string.

ErrorMessageBox Generation

Figure 3:
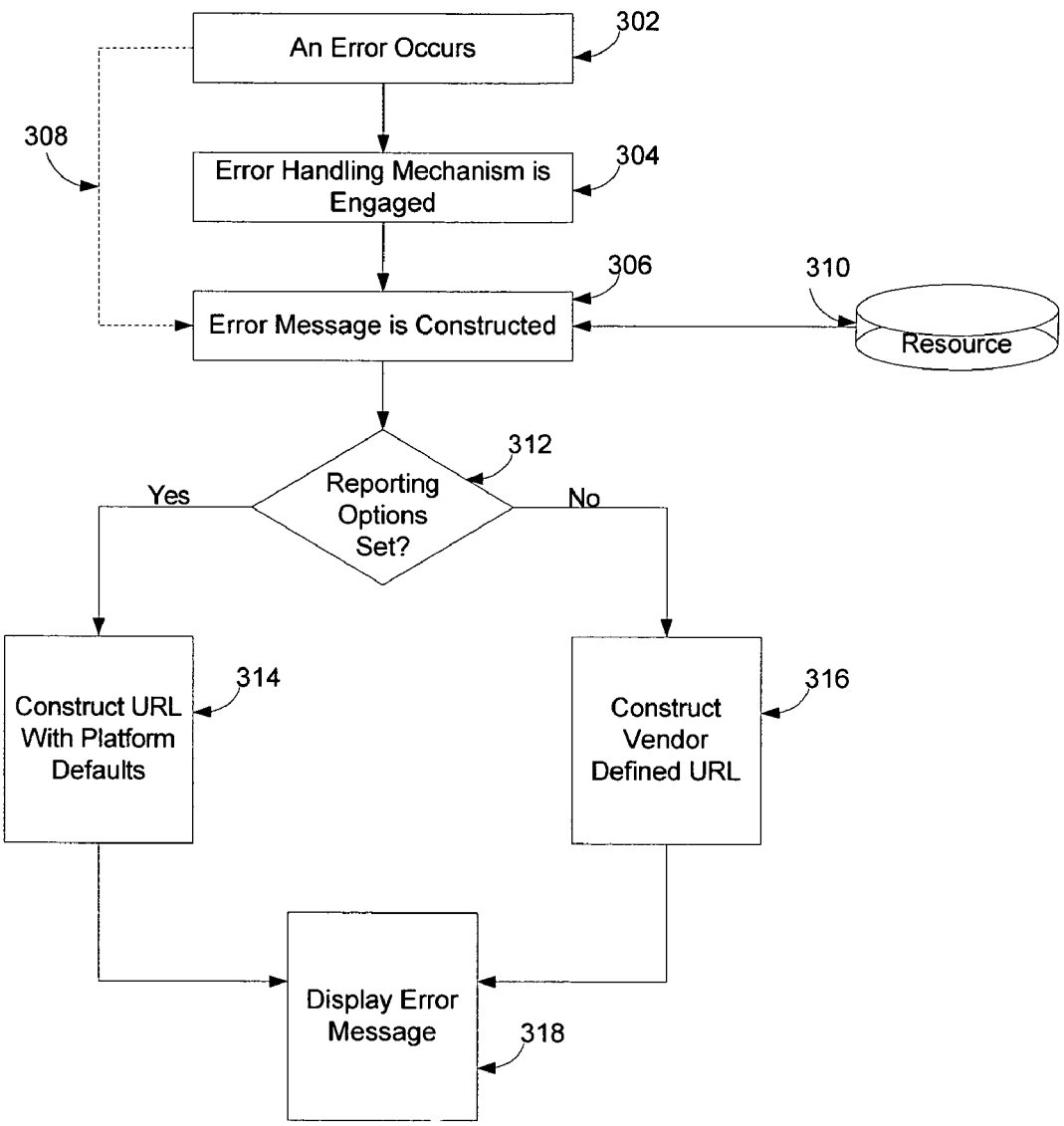
FIG. 3 is a flow diagram illustrating a method in accordance with embodiments of the present invention.

Referring now to FIG. 3, a flow diagram illustrates a method for creating an error message box according to an embodiment. Block 302 provides that an error occurs in an application or program. Block 304 provides that an error handling mechanism becomes engaged upon detection of the error. After the mechanism becomes engaged, an error message is constructed in block 306. To construct the message, according to an embodiment, block 308 provides for optional parameters to be inserted into the error message. Optional parameters can include details about the application and the like as described above, in the section entitled Application Programming Interfaces (APIs)" section 0041. Block 310 provides that construction of an error message also include retrieving an appropriate message from a resource database. The resource database can be included in an application program, be retrieved over a network, or retrieved over other appropriate retrieval mechanisms.

Decision block 312 determines whether options have been set for the error handling mechanism. More particularly, options can be set to determine whether or not the error message should be directed to a vendor-defined location or to the platform default location. If an option is set, block 314 constructs a URL that will direct the message to a platform default location. If an option is not set, block 316 constructs a vendor-defined URL. The URL and other elements of the error message are then displayed in block 318. The user can then chose to connect to the URL displayed to contact product support services.

URL

Referring now to FIG. 4, a flow diagram illustrates a method for addressing errors after a user chooses to contact product support via the URL displayed in the ErrorMessageBox.

The URL directs the user to a product support site that maintains a database resolving possible message identifier strings and links the identifiers to knowledge base articles. Identifiers that include an unsupported vendor can be rejected. If system requirements desire, the product support can choose to accept only versions for a product between predetermined builds of the product. For example, many products are built incrementally. For such products, versions of the application to which a knowledge base article is applicable can be updated when a new release is shipped. Otherwise, the identifier will fail to match an article. Exact parameters of the message box API may be omitted or ignored for database purposes if the parameters are irrelevant.

Block 400 identifies the beginning of the method. Decision block 402 determines whether a URL can be resolved. The URL is displayed on the ErrorMessageBox as shown in FIG. 2. If the URL cannot be resolved, block 404 provides for displaying a message stating that address was not found.

Block 406 then provides for directing a user to contact product support. The contact information can be displayed. For example, email addresses, phone numbers to call or further URLs can be displayed. The message identifier can be used to fill in fields at a web site or the like.

If the URL can be resolved in decision block 402, block 408 provides for a server to parse the URL. The parsing can be hierarchical. For example, the parsing can first determine a product and a version or build of the product, then parse an application identity. If a platform is supported by the URL, the extraction can include only a message identifier and message parameters depending on the platform providing support. Block 410 provides for performing a search using the message identifier. Block 412 provides for determining whether the search was successful. If so, block 414 provides for displaying a list of hits. The list of hits can be in a language that the application can directly interpret, if possible. The list of hits can be displayed to the user on a website associated with either a third party vendor, original vendor or website associated with a platform.

If the search is unsuccessful, block 416 provides for displaying product support contact information to the user, such as a phone number, email address or the like. Block 418 provides that a user chooses to contact product support. To contact product support, the user can be supplied with a bug submission form that can be mailed, emailed or filled in at a website. The system can allow for filing of a new error report if no match for the error was found. In this case, the information coming in the message ID string is used to fill the fields of the report form.

Block 420 provides that product support responds to the user's contacting product support by determining a cause and cure for the error that occurred. After the cause and cure are determined, block 422 provides that a knowledge base article is posted by product support. After an article concerning the error is posted, the next search associated with the message identifier will be successful. The flow diagram then ends with block 424.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method for reporting errors in an application, the method comprising:

generating an error message box upon determination that an error occurred, the generation of the error message box by way of an error handling mechanism engaged upon determination that the error occurred;

generating an error message for inclusion in the error message box, a content of the error message being based on the error that occurred and including at least a product name and version of the application;

generating a universal resource locator (URL) associated with the error and for inclusion in the error message box, the URL having a hierarchical structure and including at least two strings for use by product support, a first of the at least two strings being a first part of the hierarchical structure and a second of the at least two strings being a second part of the hierarchical structure, the generating including calling a function to construct the URL associated with the error after the function determines if the error message is to be delivered to a first or second location;

displaying the error message box, the error message box including the error message and URL therein; and connecting to product support in response to selection of the URL in the error message box.

2. The method of claim 1 wherein the errors are automatically resolved to corresponding documentation.

3. The method of claim 1 further comprising:

receiving information from the product support in response to the passing of the two strings, and wherein the first location is a vendor-defined location and the second location is a platform default location.

4. The method of claim 1 wherein the at least one of the two strings includes one or more of a vendor name, a product name, an image of the application state, the error message identifier, and a language appropriate for the application, the at least one of the two strings enabling interaction between a user and the product support via an application programming interface.

5. The method of claim 1 wherein the error message box is a graphical user interface including a link to the URL that can be activated by a user to connect to the product support.

6. The method of claim 5 wherein the graphical user interface further includes a title and a button for the user to acknowledge the error.

7. A computer storage medium having stored therein instructions for performing acts for creating an error message, the acts comprising:

generating an error message box upon determination that an error occurred, the generation of the error message box by way of an error handling mechanism engaged upon determination that the error occurred;

generating an error message for inclusion in the error message box, a content of the error message being based on the error that occurred and including at least a product name and version of the application;

generating a universal resource locator (URL) associated with the error and for inclusion in the error message box, the URL having a hierarchical structure and including at least two strings for use by product support, a first of the at least two strings being a first part of the hierarchical structure and a second of the at least two strings being a second part of the hierarchical structure, the generating including calling a function to construct the URL associated with the error after the function determines if the error message is to be delivered to a first or second location;

displaying the error message box, the error message box including the error message and the URL therein; and connecting to product support in response to selection of the URL in the error message box.

8. The computer storage medium of claim 7 wherein the errors are automatically resolved to corresponding documentation.

9. The computer storage medium of claim 7, the acts further comprising: receiving information from the product support in response to the passing of the two strings, and wherein the first location is a vendor-defined location and the second location is a platform default location.

10. The computer storage medium of claim 7 wherein at least one of the two strings includes one or more of a vendor name, a product name, an image of the application, the error message identifier, and a language appropriate for the application, the at least one of the two strings enabling interaction between a user and the product support via an application programming interface.

11. The computer storage medium of claim 7, wherein the error message box is a graphical user interface including a link to the URL that can be chosen by the user.

12. The computer storage medium of claim 11 wherein the graphical user interface further includes a title and a button for the user to acknowledge the error.

13. The method of claim 1 wherein the function includes strings at least identifying an application, a version of the application, and the error message identifier.

14. The method of claim 1 wherein the generating generates the URL further including the strings identifying the application and the version of the application.

15. The computer storage medium of claim 7 wherein the function includes strings at least identifying an application, a version of the application, and the error message identifier.

16. The computer storage medium of claim 7 wherein the generating generates the URL further including the strings identifying the application and the version of the application.

* * * * *